(12) United States Patent
MacFarlane

(10) Patent No.: US 7,215,462 B2
(45) Date of Patent: May 8, 2007

(54) FILTER FOR SELECTIVELY PROCESSING OPTICAL AND OTHER SIGNALS

(75) Inventor: Duncan L. MacFarlane, Dallas, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 11/377,056

(22) Filed: Mar. 16, 2006

(65) Prior Publication Data

US 2006/0209391 A1 Sep. 21, 2006

Related U.S. Application Data

(63) Continuation of application No. 10/650,658, filed on Aug. 28, 2003, now Pat. No. 7,042,657.

(51) Int. Cl.
*H01S 3/00* (2006.01)
(52) U.S. Cl. ................................. 359/337.21
(58) Field of Classification Search ............ 359/337.2, 359/337.21, 337.22
See application file for complete search history.

(56) References Cited

U.S. PATENT DOCUMENTS

| | | |
|---|---|---|
| 3,828,231 A | 8/1974 | Yamamoto |
| 4,146,297 A | 3/1979 | Alferness et al. |
| 4,588,255 A | 5/1986 | Tur et al. |
| 4,768,850 A | 9/1988 | Moslehi et al. |
| 5,022,730 A | 6/1991 | Cimini et al. |
| 5,233,187 A | 8/1993 | Sakata et al. |
| 5,343,496 A | 8/1994 | Honig et al. |
| 5,363,403 A | 11/1994 | Schilling et al. |
| 5,438,637 A | 8/1995 | Nilsson et al. |
| 5,481,533 A | 1/1996 | Honig et al. |
| 5,553,062 A | 9/1996 | Schilling et al. |
| 5,572,552 A | 11/1996 | Dent et al. |
| 5,581,642 A | 12/1996 | Deacon et al. |
| 5,629,929 A | 5/1997 | Blanchard et al. |
| 5,644,592 A | 7/1997 | Divsalar et al. |
| 5,671,247 A | 9/1997 | Souissi et al. |
| 5,680,419 A | 10/1997 | Bottomley |
| 5,687,162 A | 11/1997 | Yoshida et al. |
| 5,719,852 A | 2/1998 | Schilling et al. |
| 5,754,714 A | 5/1998 | Suzuki et al. |
| 5,757,832 A | 5/1998 | Uchida |
| 5,838,714 A | 11/1998 | Delorme |

(Continued)

OTHER PUBLICATIONS

Lo et al. Long Wavelength Photonic Integrated Circuit Surface-Emitting Lasers (PICSELs). LEOS 2001. Meeting Dates: Nov. 11, 2001-Nov. 13, 2001. vol. 2, p. 723.*

(Continued)

*Primary Examiner*—Deandra M. Hughes
(74) *Attorney, Agent, or Firm*—Karl L. Larson; Gardere Wynne Sewell, LLP

(57) ABSTRACT

A multi-section filter is provided for use in processing optical signals and other signals that can be readily projected from one filter section to another. Filters of the invention can be configured in numerous forms, including IIR and FIR filters and both linear and 2D active optical lattice filters. Filter sections are coupled together by means of four direction couplers and surface grating couplers, and may be implemented as GSE photonic integrated circuit devices.

11 Claims, 6 Drawing Sheets

U.S. PATENT DOCUMENTS

| | | | |
|---|---|---|---|
| 6,023,366 A | 2/2000 | Kinoshita | |
| 6,181,843 B1 | 1/2001 | Lee et al. | |
| 6,353,690 B1 | 3/2002 | Kulishov | |
| 6,456,766 B1 | 9/2002 | Shaw et al. | |
| 6,483,632 B1 | 11/2002 | Jolley et al. | |
| 6,552,834 B2 | 4/2003 | Bhatia et al. | |
| 6,563,631 B2 | 5/2003 | Delprat et al. | |
| 6,687,032 B1 | 2/2004 | King et al. | |
| 6,687,461 B1 | 2/2004 | MacFarlane et al. | |
| 6,782,168 B2 | 8/2004 | Hatayama et al. | |
| 6,785,446 B1 | 8/2004 | Chandrasekhar et al. | |
| 6,819,845 B2 * | 11/2004 | Lee et al. | 385/122 |
| 6,853,756 B2 | 2/2005 | Gerlach et al. | |
| 7,116,851 B2 * | 10/2006 | Welch et al. | 385/14 |
| 2003/0103761 A1 * | 6/2003 | Lam et al. | 385/146 |
| 2003/0180023 A1 | 9/2003 | Hamada | |
| 2004/0105476 A1 * | 6/2004 | Wasserbauer | 372/50 |
| 2004/0126072 A1 * | 7/2004 | Lee et al. | 385/122 |
| 2004/0228384 A1 | 11/2004 | Oh et al. | |

OTHER PUBLICATIONS

Umesh G. Jani, et al.; Multiuser Interference Suppression Using Block Shanno Constant Modulus Algorithm, *IEEE Transactions on Signal Processing*; May 2000; 1503-1506 pp.; vol. 48, No. 5.

Numai et al., 1.5 micron tunable wavelength filer using a phase-shift-controlled distributed feedback laser diode with a wide tuning range and a high constant gain. Appl. Phys. Lett. 54 (19), May 8, 1989. pp. 1859-1860.

SMU Photonics Group. Active Optical Filters. http://www.atis.org./tg2k_transfer_function.html date unavailable.

* cited by examiner

FILTER FOR SELECTIVELY PROCESSING OPTICAL AND OTHER SIGNALS

CROSS REFERENCE TO RELATED APPLICATIONS

The present application is a continuation of and claims priority to U.S. patent application Ser. No. 10/650,658, entitled "Filter for Selectively Processing Optical and Other Signals," filed in the U.S. Patent and Trademark Office on Aug. 28, 2003 now U.S. Pat. No. 7,042,657 and having a common inventor as the present document. The entire contents of the above patent application is incorporated herein by reference.

BACKGROUND OF THE INVENTION

1. Field of the Invention

The invention disclosed and claimed herein generally pertains to a multi-section filter for processing optical signals and other signals that can be directed from one filter section to another. More particularly, the invention pertains to filters of the above type, such as lattice filters, that are usefully formed from semiconductor optical amplifier regions (SOARs) coupled together by means of four direction couplers, where the four direction couplers may be implemented by surface grating couplers.

2. Discussion of the Background

A main tenet of both electrical and optical engineering is the desirability of filtering, sorting and processing information with higher degrees of precision. In electrical engineering, a significant breakthrough in precision filtering and signal processing came with the active filter. In electrical engineering, an active filter is one that includes an electronic gain element. In very early examples of the art, the electronic gain element was a vacuum tube. For the past half century, the electronic gain element has been a transistor. The improvement in filtering precision due to an electronic gain element may be intuitively understood by a simple band pass example. A passive electronic band pass filter may be made from a conductor, a capacitor, and a resistor, and will attenuate frequencies away from resonance more than frequencies near resonance. An active electronic band pass filter that includes a transistor will show improved performance because frequencies near resonance may now be amplified. Active low pass, high pass, matched, and other varieties of electronic filters also show improved performance over their passive counterparts.

Currently, there are extensive examples of passive optical filters that act to sort one frequency of light from another, separate bands of frequencies, or preferentially select a set of frequencies from another. For example, a diffraction grating will separate different colors of light into different propagation directions, allowing some to be spatially filtered. Diffraction gratings find wide applications in monochromators and spectraphotometers, as well as in dense wave division multiplexed (DWDM) telecommunications systems. For a second example, a thin film coating filter may be used to greatly reduce or greatly increase the reflected light from an air-glass interface. Anti-reflection (AR) thin film coatings find wide application in camera, telescope and eyeglass lenses. High reflectivity (HR) thin film coatings find wide application in laser mirrors. Thin film filters also find wide application in DWDM telecommunication systems to add, drop and otherwise sort channels.

A shortcoming of the optical filters currently known is that they are passive. Current optical filters do not have gain, and thus their performance is limited. For example, the quality factor of a filter is equal to a resonant frequency divided by the uncertainty in that frequency $f/(\Delta f)$. It is well known that the quality factor of a passive filter is lower than the quality factor of an active filter of the same order. Thus, there is a need for an optical filter that is active and yields higher performance including higher quality factors. This will enhance tunabilty of such filters and provide numerous other benefits.

Another shortcoming of the optical filters currently known is that they are manufactured for specific applications. It would be very desirable to provide optical filters that could be readily constructed from combinations of conventional or standardized elements or components. Providing this capability could significantly enhance flexibility in designing optical filters and could also reduce costs associated therewith.

SUMMARY OF THE INVENTION

The invention is generally directed to a multi-section or multi-stage filter for use in processing optical signals, as well as other signals that can be readily projected or directed from one filter section to another. Thus, filter sections can be respectively positioned in relation to one another so that an output signal from one element can be projected as an input to another section. These characteristics enable filters of the invention to be configured or embodied in numerous forms, to meet many different application requirements. These can include, without limitation, infinite impulse response (IIR) filters, finite impulse response (FIR) filters and both linear and two-dimensional (2D) optical lattice filters, as described hereinafter in further detail. Moreover, respective filter sections can be readily provided with controllable gain and delay, so that embodiments of the invention can be configured as active filters.

In important embodiments of the invention, controllable active optical filter sections may be constructed by placing electrodes upon active regions of a semi-conductor material, to form gain regions, or SOARs. Surface gratings are formed in the semi-conductor material between adjacent SOARs, for coupling optical signals therebetween. It is anticipated that standardized arrays of active optical filter sections, having the above features, could be formed with high precision and at reduced cost, using mass production techniques that are well known in the fabrication of semi-conductor devices. A standardized array could then be configured for a particular optical signal processing application, using pole and zero or other conventional design techniques.

One useful embodiment of the invention is directed to an active optical filter comprising a filter input component disposed to receive an optical input signal, a filter output component disposed to provide a filtered output signal, an optical output amplifier and at least one optical delay element. A surface grating coupler is positioned between the optical amplifier and each delay element to form a first light transmission path, the first light transmission path having its ends coupled to the filter input and output components, respectively. The active optical filter further comprises a second light transmission path disposed to transmit optical signals without delay from the filter input component to the filter output component. It is anticipated that this embodiment can be adapted to operate in either an IIR or an FIR mode.

A further embodiment of the invention is directed to an active optical lattice filter for selectively processing an optical input signal. The filter comprises a plurality of active lattice sections, or gain blocks, spaced apart from one another in a linear array, and a surface grating coupler positioned between each pair of adjacent gain blocks in the array. Each of the gain blocks is disposed to receive an optical signal as an input from one of its adjacent gain blocks, to transmit a portion of the received input to its other adjacent gain block, and to reflect the remainder of the received input. Each of the gain blocks is provided with controllable gain and delay characteristics, respectively selected to produce an output from the linear lattice array comprising an IIR when the input signal comprises a single optical pulse.

Yet another embodiment, in its most general form, is directed to a 2D lattice filter disposed to selectively process a received input signal. The 2D filter comprises a plurality of gain blocks, each gain block disposed to receive, process and project specified signals, the gain blocks being grouped into one or more filter sections for the lattice filter. A number of 2D lattice couplers, each associated with gain blocks in at least one of the sections, are each positioned to exchange specified signals directed along a first axis with one of its associated gain blocks, and to exchange specified signals directed along a second axis orthogonal to the first axis with another of its associated gain blocks. Usefully, the lattice filter output is an IIR, when the received input signal comprises a single pulse. In a preferred embodiment, the input signal comprises a single optical pulse, each of the lattice couplers comprises a crossed grating coupler, and the gain blocks have controllable gain and delay characteristics.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein.

DETAILED DESCRIPTION OF PREFERRED EMBODIMENT

Figure 1:
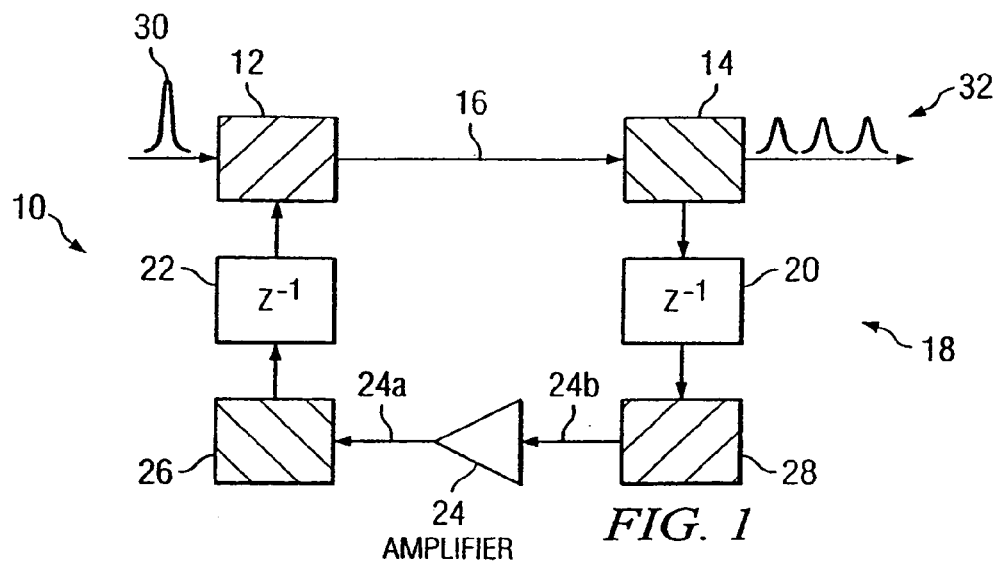
FIG. 1 is a schematic diagram showing a single stage IIR active optical filter using surface grating couplers in accordance with an embodiment of the invention.

Referring now to the drawings, wherein like reference numerals designate identical or corresponding parts throughout the several views, preferred embodiments of the present invention are described.

Referring to FIG. 1, there is shown a first order or single stage active optical filter 10, constructed in accordance with an embodiment of the invention. Filter 10 has an input component, comprising a surface grating coupler 12 disposed to receive optical input signals, and an output component likewise comprising a surface grating coupler 14. Optical signals are projected directly from surface grating coupler 12 to surface coupling 14 along a light transmission path 16, which is configured to avoid delaying light signals passing therethrough.

Each of the grating couplers 12 and 14 usefully comprises a component of a grating surface emitter (GSE) photonic integrated circuit (IC). A surface grating coupler of this type may be fabricated by conventional techniques, wherein a series of grooves or ridges are formed in the surface of an active region of semiconductor material carrying laser light. Light is projected in both directions through the grating coupler, wherein the amount of light passing in each direction is determined by the depth and spacing of respective grooves. A grating coupler may also be configured to couple light in two orthogonal directions. Thus, a surface grating coupler receiving a single optical input signal may provide two optical output components in directions orthogonal to one another. Alternatively, a grating coupler that furnishes a single optical output signal may receive two optical input components from different directions, which may be orthogonal to one another.

Referring further to FIG. 1, there are shown the above properties of surface grating couplers used in constructing optical filter 10. That is, output grating coupler 14 receives a single optical input signal from transmission path 16, but provides two optical output components, one comprising the filter output and the other being coupled to the input end of a light transmission path 18. FIG. 1 shows light transmission path 18 comprising optical delay elements 20 and 22, an optical amplifier 24 and surface grating couplers 26 and 28. Grating coupler 26 is positioned between delay element 22 and the output side 24a of optical amplifier 24, and grating coupler 28 is positioned between delay element 20 and the input side 24b of optical amplifier 24. The output of delay element 22, which is the output end of light transmission path 18, is supplied as an input signal to gradient coupler 12, together with the filter input signal, to collectively provide the optical signal transmitted along path 16.

Each of the delay elements 20 and 22 delays light passing therethrough by a known delay period, and optical amplifier 24 is provided with controllable gain. Usefully, this may be implemented by means of associated adjustable voltage controls. In one embodiment, optical amplifier 24 and delay elements 20 and 22 comprise further components of the GSE photonic IC described above. In such arrangement, optical amplifier 24 includes a gain region of the semiconductor active region that is in adjacent relationship with an electrode. Gain through the gain region may then be controlled by adjusting the voltage applied to the electrode. It will be observed that the active gain region can be located between the grating couplers 26 and 28 by forming them in the surface of the semiconductor material, as described above, at positions respectively adjacent to the gain region. Construction of components of a GSE photonic IC is described hereinafter in further detail, in connection with FIG. 4.

In accordance with the invention, it has been recognized that by judicious adjustments of the gain provided by amplifier 24, the comparatively simple active optical filter 10 shown in FIG. 1 can be readily adapted to perform numerous filtering tasks. For example, the filter 10 of FIG. 1 can be adapted to generate an IIR 32 in response to a single optical input pulse 30. Moreover, by adjustment of amplifier 24 the filter 10 can be tuned to operate at a specified frequency. Alternatively, filter 10 can be programmed to transmit only optical signals lying in a passband of specified bandwidth.

Figure 2:
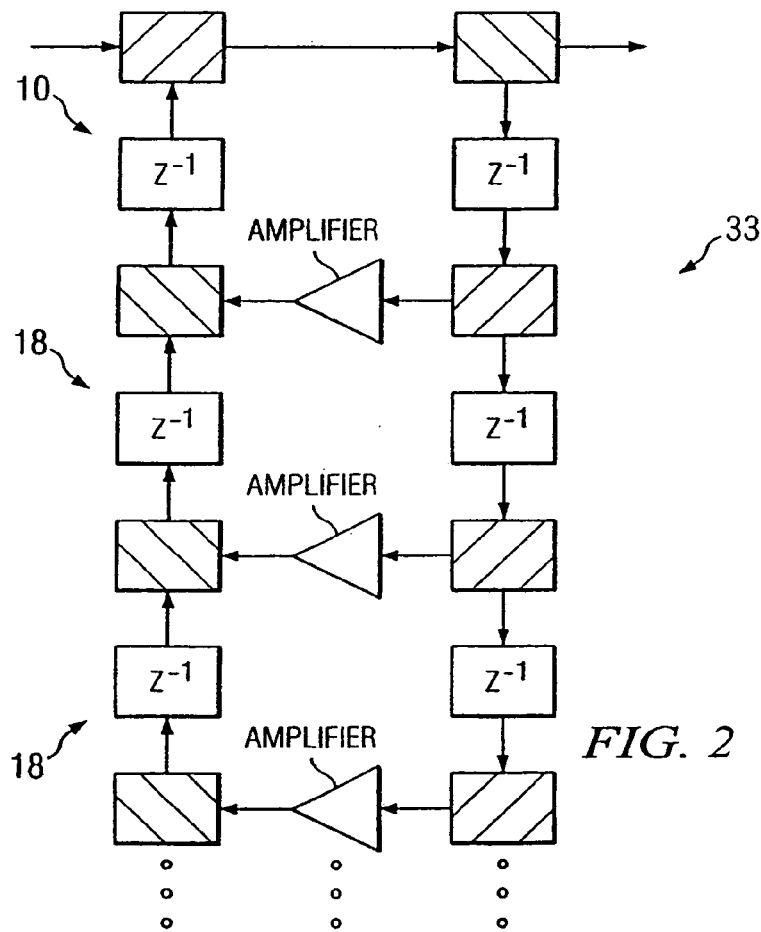
FIG. 2 is a schematic diagram showing a multi-stage IIR active optical filter that includes the single stage filter shown in FIG. 1.

Referring to FIG. 2, there is shown the single stage filter 10 of FIG. 1 combined with a number of additional light transmission paths 18, to form a multi-stage or higher order optical filter 33. It will be readily apparent that an optical filter 33 of virtually any order can be formed as a GSE photonic IC, by simply repeating steps used in forming respective components of the single order optical filter 10.

Figure 3:
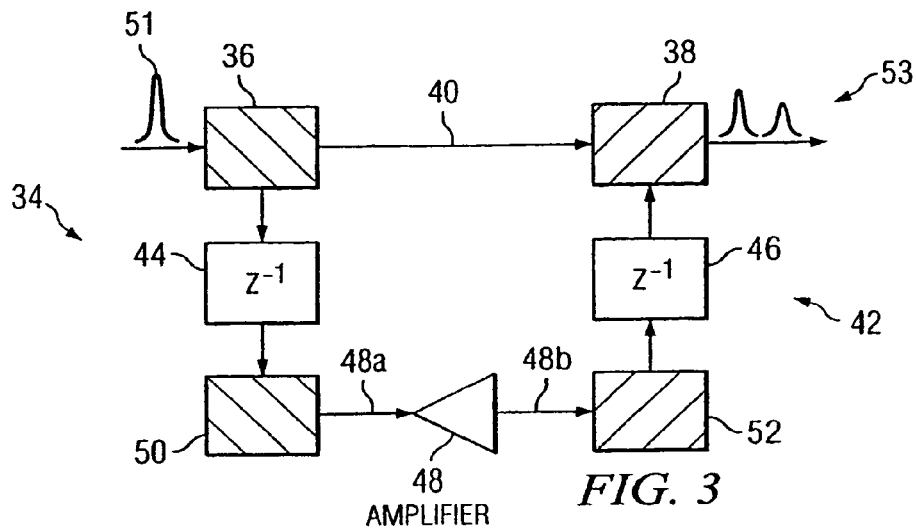
FIG. 3 is a schematic diagram showing a single stage FIR active optical filter using surface grating couplers in accordance with a further embodiment of the invention.

Referring to FIG. 3, there is shown a single order active optical filter 34 formed of components respectively similar to those of filter 10, described above. Thus, optical filter 34 has an input component 36 and an output component 38, each comprising a surface grating coupler, and a light transmission path 40 disposed to carry light signals from grating coupler 36 to grating coupler 38 without delay. Active optical filter 34 is further provided with a light transmission path 42. FIG. 3 shows light transmission path 42 comprising optical delay elements 44 and 46, an optical amplifier 48 and surface grating couplers 50 and 52. Grating coupler 50 is positioned between delay element 44 and the input side 48$a$ of optical amplifier 48, and grating coupler 52 is positioned between delay element 46 and the output side 48$b$ of amplifier 48.

Referring further to FIG. 3, there is shown filter input component 36 providing two optical output components, one coupled through light transmission path 40 to filter output component 38, and the other coupled to delay element 44, at the input end of light transmission path 42. The output end of path 42 is coupled as a second input to filter output component 38, which combines the inputs thereto to provide the overall filter output. As with filter 10, the gain of output amplifier 48 of filter 34 is controllable, as are the delays of delay elements 44 and 46. By judicious adjustments of its gain and delays, optical filter 34 can be adapted to generate an output comprising an FIR 53, when single optical pulse 51 is applied to the filter input.

It is anticipated that components of optical filter 34 can be constructed as respective components of a GSE photonic IC. It is anticipated further that one or more additional light transmission paths 42 can be connected to single order filter 34, similar to the configuration shown in FIG. 2, to construct an FIR optical filter of higher order.

Figure 4:
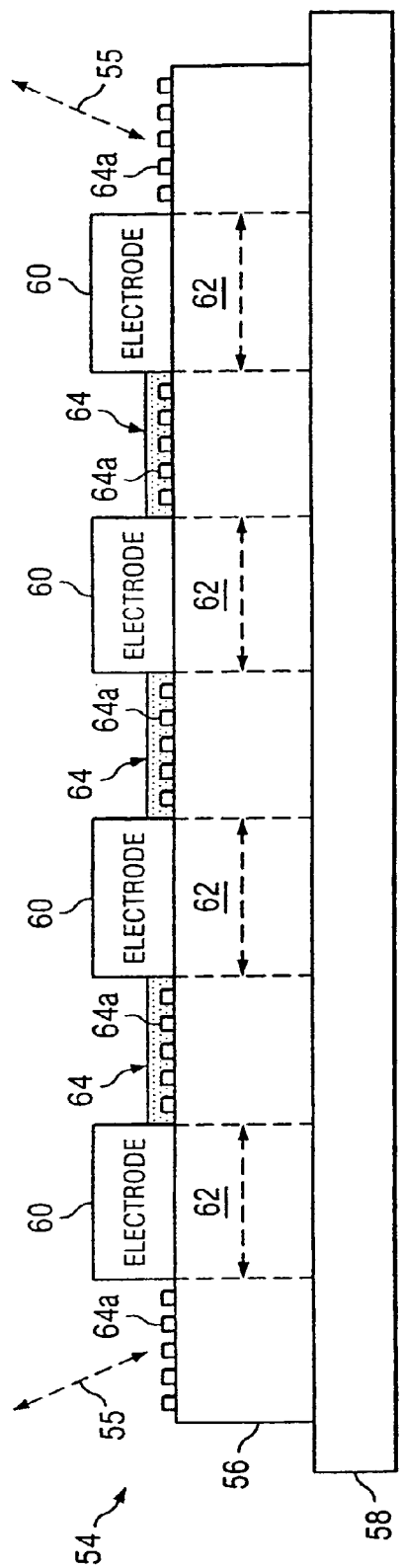
FIG. 4 is a schematic diagram illustrating use of semiconductor material disposed to conduct optical signals and form SOARs, in order to implement embodiments of the invention.

Referring to FIG. 4, there is shown a GSE photonic IC 54 of a type which may be used to construct or implement embodiments of the invention. IC 54 comprises an active region 56, formed of semiconductor material such as AlGaInP, supported upon a substrate 58 formed of GaAs. As is known by those of skill in the art, light 55 projected from a surface emitting laser light can be directed to move along the active region 56 in the direction of the arrows, that is, rightward or leftward as viewed in FIG. 4.

Referring further to FIG. 4, there are shown electrodes 60 adjoining active region 56, at selected locations. If an electrode 60 is operated to apply a voltage to an adjacent portion of active regions 56, a light component or optical signal passing though the portion can be made to experience either a positive or negative gain. Thus, such portions of the active region comprise gain regions 62. It will be observed that gain regions 62 may advantageously be used to implement optical amplifiers such as amplifiers 24 and 48 shown in FIGS. 1 and 3, respectively.

FIG. 4 further shows gratings 64 formed in the surface of active region 56. As described above, the amount of light traveling in each direction through a grating 62 is determined by the depth and spacing of its respective grooves. A surface grating 64 may function as a coupler or interface for optical signals passing into or out of an adjacent amplifier gain region 62. The depth and spacing of respective grooves 64$a$ of a grating 64 may be configured to regulate the passage and direction of light therethrough as desired. A grating coupler or interface 64 can comprise a number of parallel grooves. Alternatively, a surface grating can comprise one or more trenches formed in active region 56, or can comprise a crossed grating. A crossed grating is described hereinafter, in connection with FIG. 8.

Figure 5:
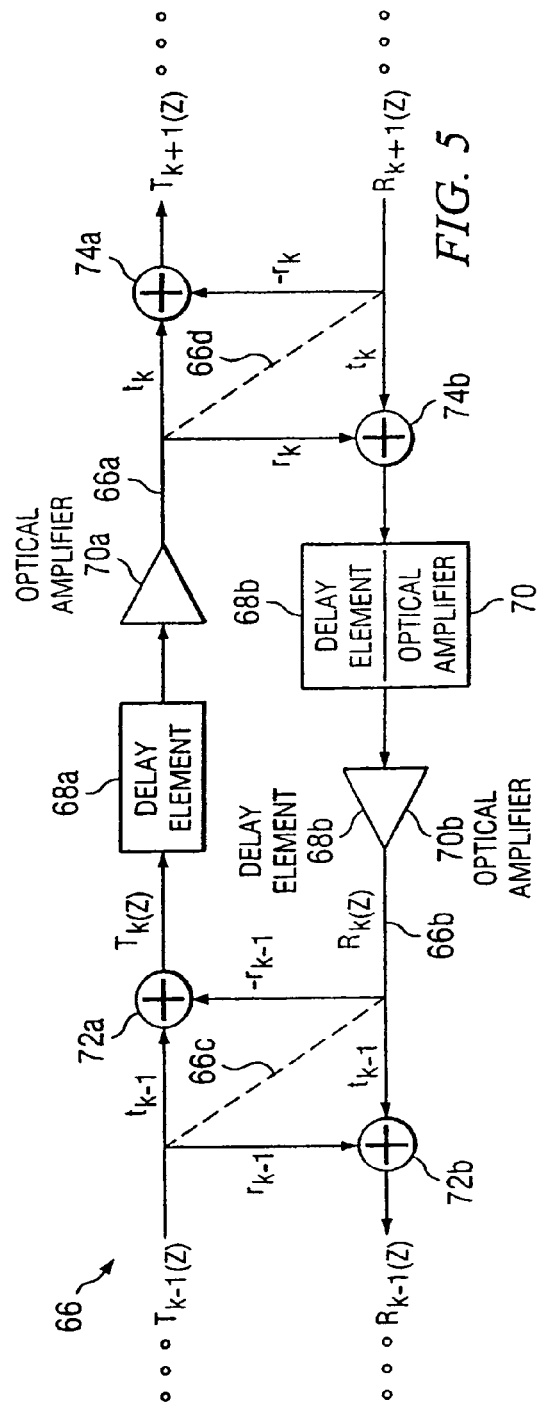
FIG. 5 is a diagram illustrating optical signal flow in gain block, or latticesection, of an active optical lattice filter.

Referring to FIG. 5, there is shown a transfer function diagram depicting the optical signal flow in a lattice filter section, or gain block 66, of an active optical lattice filter. A lattice filter comprises a number of gain blocks placed end to end in series. From the overall transfer function of a lattice filter, computed from all the gain blocks collectively, the filter operating characteristics can be determined. Each gain block has a controllable optical amplifier to amplify optical signals passing therethrough. A component of the optical signal will be transmitted into the next following gain block, and another component will be reflected back, by the interface 66$d$ with the next following gain block. Thus, the transfer diagram of FIG. 5 shows two light paths, a light path 66$a$ for transmitted light signal $T_k(z)$, traveling through the gain block 66 in a forward direction, and a light path 66$b$ for reflective light signal $R_k(z)$, traveling through gain block 66 in the opposing direction. FIG. 5 further shows transmissive light path 66$a$ provided with an optical amplifier 70$a$ having a gain G, and a delay element 68$a$ having an impedance $Z^{-1/2}$. Element 68$a$ represents the delay of light traveling from interface 66$c$ to interface 66$d$, where interfaces 66$c$ and 66$d$ are the boundaries between gain block 66 and the preceding and the next following gain blocks, respectively, of the corresponding lattice filter. Reflective light path 66$b$ is similarly provided with an optical amplifier 70$b$ and a delay element 68$b$.

Referring further to FIG. 5, gain block 66 is shown to have an optical input signal $T_{k-1}(z)$ from the preceding filter section. A component of the optical input signal is transmitted past interface 66$c$ as $t_{k-1}$, and another component is reflected by interface 66$a$ as $r_{k-1}$. In like manner, $R_k(z)$ produces $t_{k-1}$ and $-r_{k-1}$ upon encountering interface 66$c$. FIG. 5 shows $t_{k-1}$ and $-r_{k-1}$ combined to generate $T_k(z)$, and shows $t_{k-1}$ and $-r_{k-1}$ combined to generate $R_{k-1}(z)$. These operations are represented in FIG. 5 by summers 72$a$ and 72$b$, respectively. Similarly, $t_k$ and $-r_k$ are combined to generate $T_{k+1}(z)$, and $t_k$ and $-r_k$ are combined to generate $R_k(z)$. These operations are represented by summers 74a and 74b, respectively. Further description of an optical lattice filter can be found in commonly owned U.S. patent application Ser. No. 09/432,352, filed Nov. 2, 1999.

Figure 6:
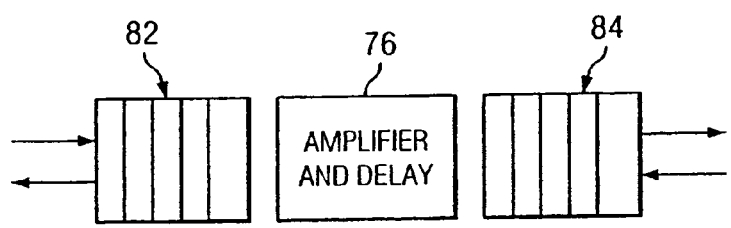
FIG. 6 is a diagram showing signal flow in a gain block of an optical lattice filter constructed in accordance with an embodiment of the invention.

Referring to FIG. 6, there is shown a lattice filter section or gain block 76 constructed in accordance with the invention, wherein gain block 76 generally operates in like manner as gain block 66, described above, and has similar flow paths. Thus, gain block 76 includes a transmissive light path provided with an optical amplifier and a delay element, and is also provided with a reflective light path provided with an optical amplifier and a delay element. Each of these elements is similar to the corresponding element shown in FIG. 5. However, FIG. 6 additionally shows gain block 76 coupled to a surface grating coupler 82, to transfer optical signals at its input side, and also coupled to surface grating coupler 84, to transfer optical signals at its output side. More generally, a surface grating coupler is placed between each two adjacent gain blocks or lattice sections of an active optical lattice filter, to transfer optical signals between the adjacent sections.

Figure 7:
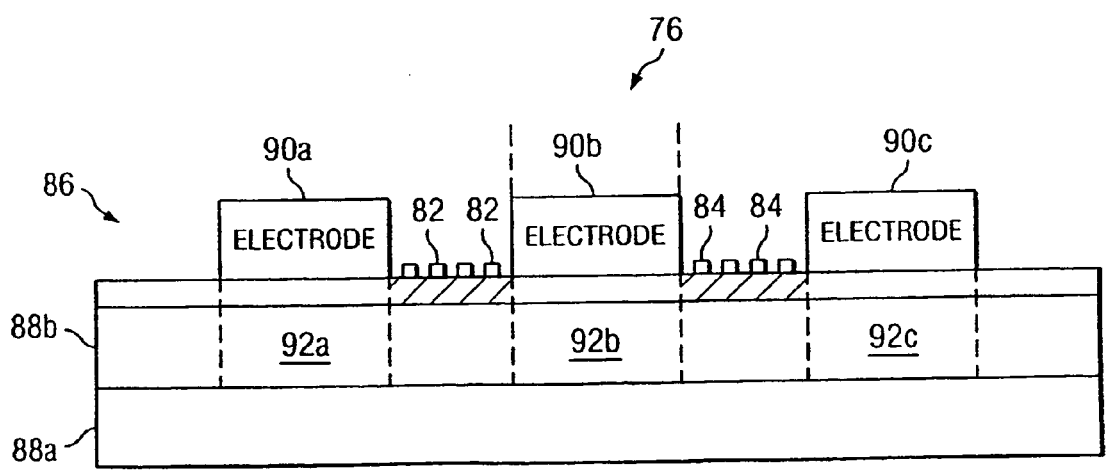
FIG. 7 is a schematic diagram showing a lattice filter including the gain block of FIG. 6 and constructed from semiconductor material as described in connection with FIG. 4.

Referring to FIG. 7, there is shown an active optical lattice filter 86 that includes a gain block 76 and grating couplers 82 and 84, as described in connection with FIG. 6. Lattice filter 86 is constructed from semiconductor material, as described above, as a GSE photonic IC. Thus, filter 86 includes a substrate 88a, and an active region 88b disposed to conduct or pass optical signals.

Referring further to FIG. 7, there are shown electrodes 90a–c placed upon active region 88b, in spaced apart relationship. Electrodes 90a–c generate gain regions 92a–c, respectively, in the active region as described above. FIG. 7 shows gain region 92b providing the amplification for lattice section 76, that is, the amplification represented in FIG. 6 by amplifiers 80a and 80b. FIG. 7 further shows grating couplers 82 and 84 formed in the surface of active region 88b, in the spaces between gain region 92b and gain regions 92a and 92c, respectively. Filter 86 usefully comprises an IIR filter.

Figure 8:
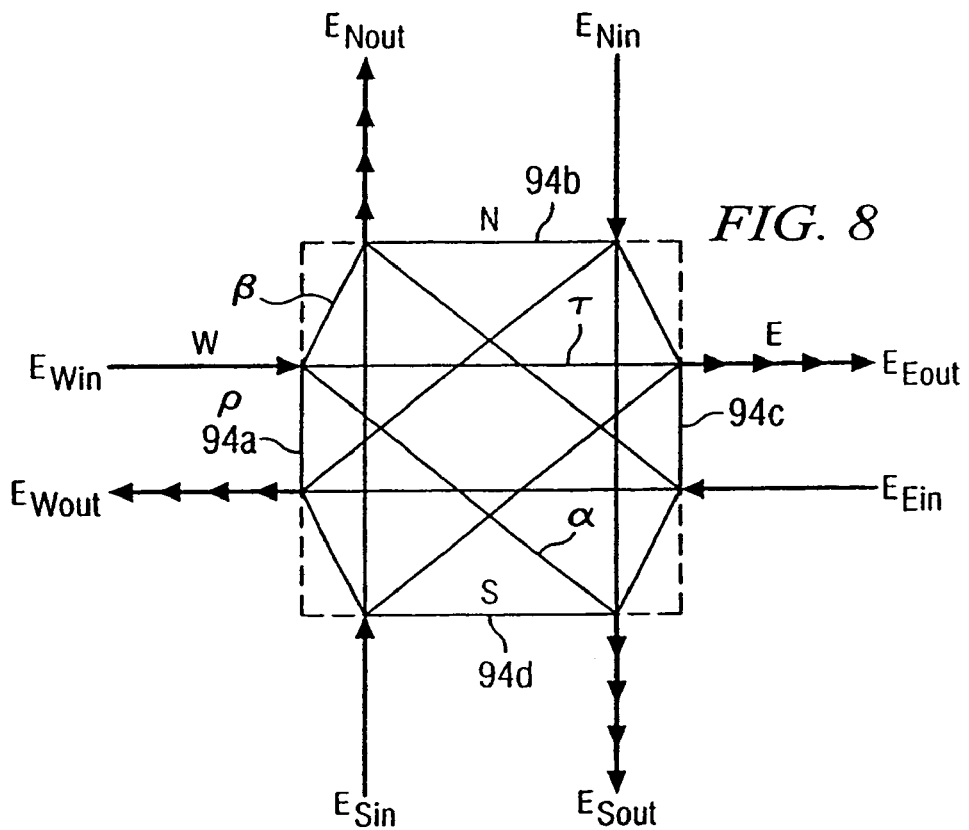
FIG. 8 is a schematic diagram showing the signal flow in a four direction coupler.

Referring to FIG. 8 there is shown the signal flow in a four direction coupler. A defining feature of the traditional lattice structure is the presence of an interface, depicted in FIG. 8 by components 94a–d, where a portion of the signal is reflected and a portion is transmitted. In several embodiments of the invention disclosed herein, an interface is constructed that routes fractions into four directions rather than the two of reflection and transmission. This four direction coupler may be realized through a photonic crystal, a crossed grating structure or through crossed beam splitters. Based on the teachings in this specification, it will be appreciated by those skilled in the art that these technologies may also be employed to create five, six, and higher direction couplers, and that these may be used to construct more complex two dimensional lattice filters. Herein, five and higher direction couplers are referred to generically as multi-direction couplers.

Referring further to FIG. 8 there is shown the signal flow of a four direction coupler. The coupler may support up to four input signals, and will yield four output signals. Herein, the four ports are referred to as N, S, E and W. For each port there is a reflection coefficient $\rho$, a transmission coefficient $\tau$, a right handed coupling coefficient, $\alpha$, and a left handed coupling coefficient, $\beta$. Consequently the four direction coupler is characterized by as many as 16 parameters.

In physical systems, the four dimensional coupler of FIG. 8 must conserve energy. Accordingly, constraints are derived on the $\alpha$'s, $\beta$'s, $\rho$'s and $\tau$'s imposed by energy conservation according to field theory, an approach most pertinent to the photonic realization of this filter. To conserve energy, the sum of the output powers must equal the sum of the input powers. If a single input, $E^W_{in}$ is applied at the west port, then there will be four output signals, $E^W_{out}$, $E^N_{out}$, $E^E_{out}$, and $E^S_{out}$. Since the powers are proportional to the square of the total fields, the first condition imposed by energy conservation is:

$$\rho_2^W + \alpha_2^W + \tau_2^W + \beta_2^W = 1 \quad (1)$$

Three more conditions emerge by applying a single input at each of the north, east and south ports. These are:

$$\rho_2^N + \alpha_2^N + \tau_2^N + \beta_2^N = 1 \quad (2)$$

$$\rho_2^E + \alpha_2^E + \tau_2^E + \beta_2^E = 1 \quad (3)$$

and $$\rho_2^S + \alpha_2^S + \tau_2^S + \beta_2^S = 1 \quad (4)$$

Two more energy conservation conditions follow from applying two input signals to opposite ports. Applying inputs to the west and east ports yields:

$$\rho_W \tau_E + \rho_E \tau_W + \alpha_W \beta_E + \alpha_E \beta_W = 0 \quad (5)$$

Similarly, applying inputs to the north and south ports yields:

$$\rho_N \tau_S + \rho_S \tau_N + \alpha_N \beta_S + \alpha_S \beta_N = 0 \quad (6)$$

Four final energy conservation conditions follow from applying two inputs to adjacent ports. Applying inputs to the west and north ports yields:

$$\rho_W \alpha_N + \rho_N \beta_W + \tau_W \beta_N + \tau_N \alpha_W = 0 \quad (7)$$

Similarly applying inputs to the north and east ports yields:

$$\rho_N \alpha_E + \rho_E \beta_N + \tau_N \beta_E + \tau_E \alpha_N = 0 \quad (8)$$

Similarly applying inputs to the east and south ports yields:

$$\rho_E \alpha_S + \rho_S \beta_E + \tau_E \beta_S + \tau_S \alpha_E = 0 \quad (9)$$

Similarly applying inputs to the south and west ports yields:

$$\rho_S \alpha_W + \rho_W \beta_S + \tau_S \beta_W + \tau_W \alpha_S = 0 \quad (10)$$

The four cases of three inputs and the one case of four inputs do not yield any new constraints, and thus yield no new information.

Energy conservation equations (1) through (10) must be satisfied for a physically real coupler and will also assure stability in a passive network comprised of these couplers. We also note that these equations reduce to their two port equivalents for the case of $\alpha=\beta=0$. However, equations (1) through (10) need not be the only constraints on the 16 parameters. The coupler may obey other constraints such as symmetry, and these additional constraints may further limit the number of allowable sets of coefficients. For example, a solution to equations (1) through (10) under the condition for perfect symmetry is $\alpha=\beta=\tau=\frac{1}{2}$, $\rho=-\frac{1}{2}$ for each port. This example illustrates the implication of equations (1) through (10) that the solution set includes at least one negative coupling coefficient per port, and this may be interpreted as a required phase shift of a coupled wave.

Equations (1) through (10) are algebraically nonlinear, and hence their simultaneous solution is not necessarily straight-forward. While there are many approaches to their solution, one convenient approach is to first select the values for three coefficients of a first port, then select the values for two coefficients of a second port, and finally select the value for one coefficient of a third port. This approach will usually yield eight possible solution sets from which one may be chosen based on additional constraints or design preferences.

Figure 9:
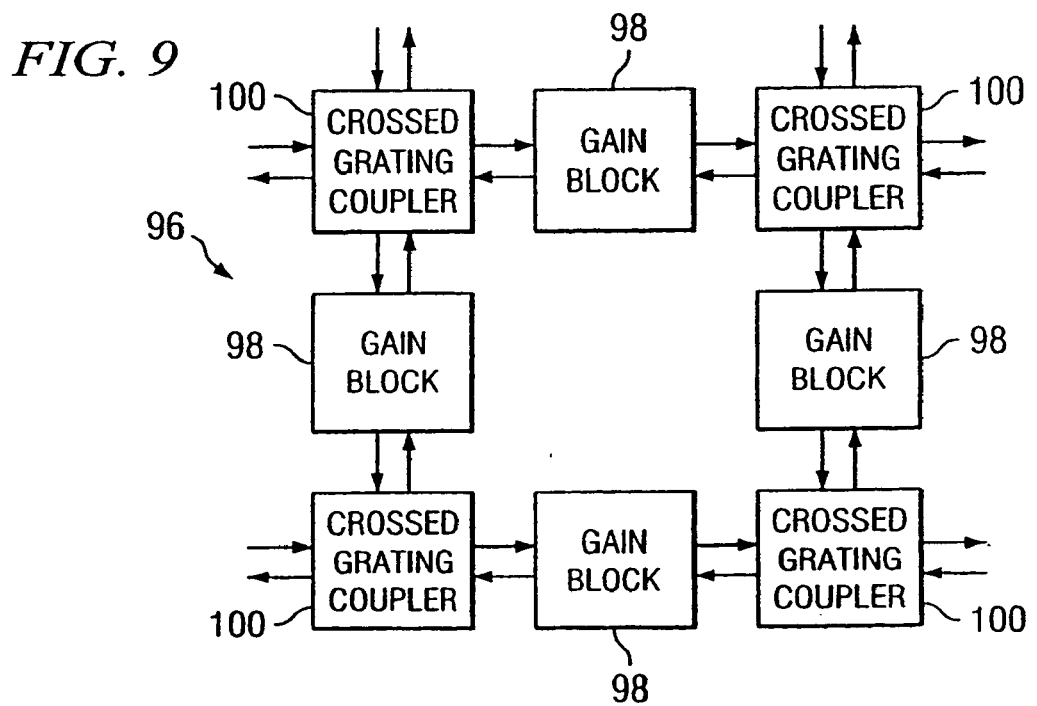
FIG. 9. is a schematic diagram showing a stage or section of a 2D active optical lattice filter using the 2D coupler of FIG. 8.

Referring to FIG. 9, there is shown a further embodiment of the invention, wherein crossed gratings as described above are used to construct a lattice section 96 for a 2D active optical lattice filter. FIG. 9 more particularly shows the lattice section 96 comprising four gain blocks 98, each providing two paths for optical signal flow in opposing directions, as described above in connection with the gain blocks of FIGS. 5 and 6. FIG. 9 further shows section 96 including four crossed grating couplers 100, each positioned or interspersed between two adjacent gain blocks 98 in order to form a closed loop or path for the flow of optical signals. That is, each crossed grating coupler 100 is positioned to exchange signals with one gain block 98 through a first one of its faces, and to exchange signals with the other gain block 100 through another of its faces, orthogonal to the first face. As further shown by FIG. 9, one or both of the remaining faces of each crossed grating coupler 100 is available to exchange signals with other lattice sections 96, or to receive or project filter input or output signals, respectively.

Figure 10:
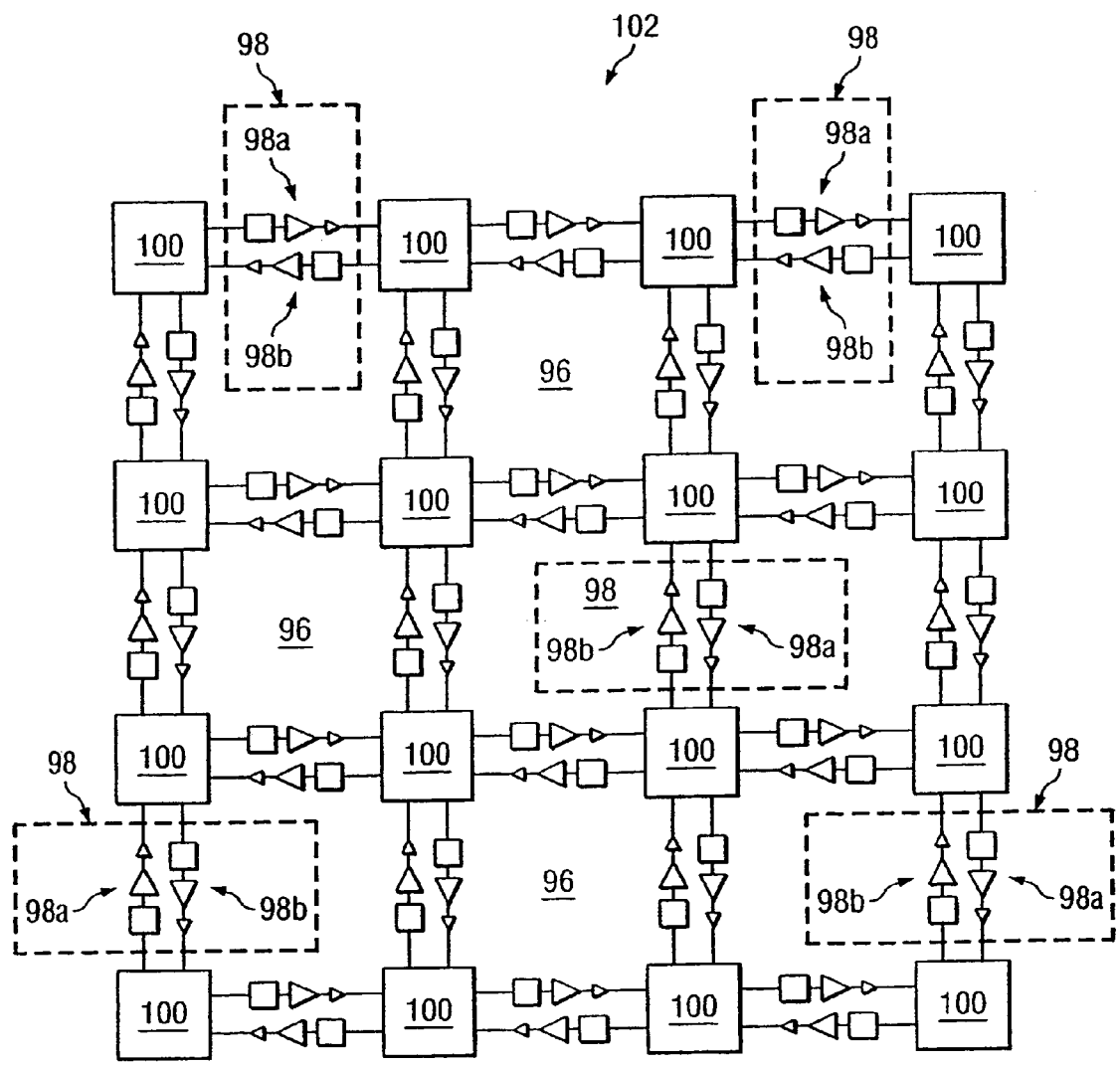
FIG. 10 is a schematic diagram showing a 2D lattice filter formed of multiple stages of the type shown in FIG. 9.

Referring to FIG. 10, there are shown a number of 2D lattice sections 96 joined to form a 2D active optical lattice filter 102. It will be readily apparent that sections 96 may be added continually to filter 102 as desired, along each of two dimensions. FIG. 10 further depicts two opposing optical signal flowpaths of each gain block 98 as paths 98a and 98b, respectively.

Figure 11:
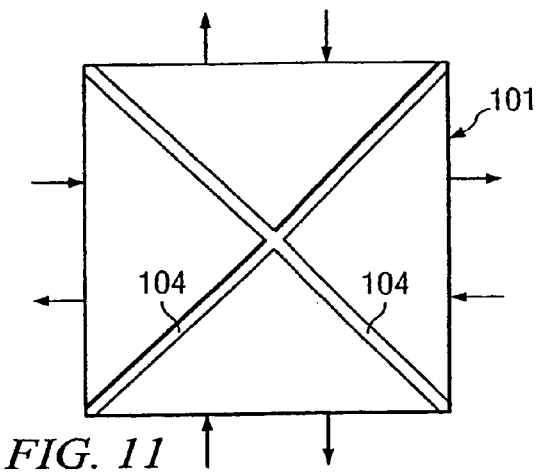
FIG. 11 is a schematic diagram showing a top view of a four direction coupler implemented as crossed beamsplitters.

Referring now to FIG. 11, there is shown a schematic diagram of a top view of a four direction coupler implemented as crossed beamsplitters. This is a preferred embodiment of the four direction coupler in both a bulk optics implementation and an integrated architecture. In a bulk optics implementation the crossed beamsplitters are realized by thin film filters on a flat substrate or a prism substrate or by pellicle beamsplitters. In a wafer or die scale integrated optics architecture a preferred method of fabricating the crossed beamsplitters is by etching trenches 104 into the semiconductor substrate 101, as specifically shown by FIG. 11. As is well known in the art the etching may be performed by a focused ion beam or by photolithography followed by reactive ion etching. The thickness of the trenches and the depth of the trenches, in particular the degree to which it reaches the waveguide region, control the relative coupling coefficients.

Figure 12:
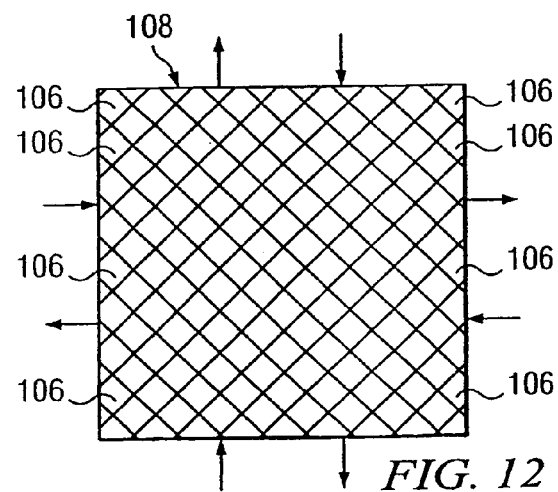
FIG. 12 is a schematic diagram showing a top view of a four direction coupler implemented as a crossed surface grating.

FIG. 12 is a schematic diagram showing a top view of a four direction coupler implemented as a crossed surface grating. This is a preferred embodiment of the four direction coupler in an integrated architecture. In a wafer or die scale integrated optics architecture a preferred method of fabricating the crossed surface grating is by etching a repetitive grating pattern 106 into the semiconductor substrate 108. As is well known in the art the etching may be performed by a focused ion beam or by photolithography followed by reactive ion etching. The photolithography may be performed by a mask or by multiple beam interference of a coherent (laser) source. The pitch, profile and the depth of the grating, in particular the degree to which it reaches the waveguide region, control the relative coupling coefficients. For example a deeper grating in one direction than the other will lead to a stronger coupling in the first direction than the second.

Figure 13:
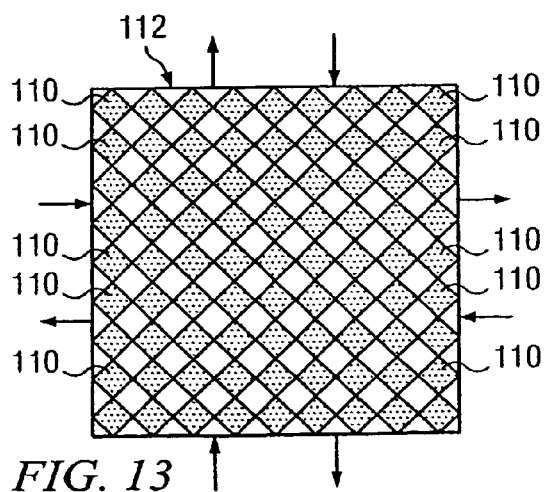
FIG. 13 is a schematic diagram showing a top view of a four direction coupler implemented as a photonic crystal.

FIG. 13 is a schematic diagram showing a top view of a four direction coupler implemented as a photonic crystal. This is a preferred embodiment of the four direction coupler in an integrated architecture. In a wafer or die scale integrated optics architecture a preferred method of fabricating the photonic crystal is by etching a photonic crystal pattern 110 into the semiconductor substrate 112. As is well known in the art the etching may be performed by a focused ion beam or by photolithography followed by reactive ion etching. The photolithography may be performed by a mask or by multiple beam interference of a coherent (laser) source. The particular pattern and the depth of the photonic crystal pattern, in particular the degree to which it reaches the waveguide region, control the relative coupling coefficients.

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise then as specifically described.

The invention claimed is:

1. An active optical filter comprising:
a filter input component disposed to receive an optical input signal;
a filter output component disposed to provide a filtered output signal;
an optical amplifier;
at least one optical delay element;
a surface grating coupler positioned between said optical amplifier and each of said optical delay elements to form a first light transmission path, said first light transmission path having an end coupled to said filter input component and another end coupled to said filter output component, the surface grating coupler having a grating surface emitter photonic integrated circuit; and
a second light transmission path configured to transmit optical signals without delay from said filter input component to said filter output component.

2. The active optical filter of claim 1, wherein said first light transmission path has an input end coupled to said filter output component, and an output end coupled to said filter input component, to produce a filtered output signal comprising an infinite pulse response (IIR) when an optical pulse is applied as an input signal to said filter input component.

3. The active optical filter of claim 2, wherein said first light transmission path includes a first surface grating coupler and a first optical delay element positioned between an input side of said optical amplifier and said filter output component, and a second surface grating coupler and a second delay element positioned between an output side of said optical amplifier and said filter input component.

4. The active optical filter of claim 3, wherein said first light transmission path comprises multiple optical amplifiers, each having associated optical delay elements and surface grating couplers interconnected to form a filter of selected higher order.

5. The active optical filter of claim 1, wherein said first light transmission path has an input end coupled to said filter input component, and an output end coupled to said filter output component, to produce a filtered output signal comprising a finite impulse response (FIR) when an optical pulse is applied as an input signal to said filter input component.

6. The active optical filter of claim 5, wherein said first light transmission path includes a first surface grating coupler and a first optical delay element positioned between an input side of said optical amplifier and said filter input component, and a second surface grating coupler and a second delay element positioned between the output side of said optical amplifier and said filter output component.

7. The active optical filter of claim 6, wherein said first light transmission path comprises multiple optical amplifiers, each having associated optical delay elements and surface grating couplers interconnected to form a filter of selected higher order.

8. The active optical filter of claim 1, wherein said surface grating couplers comprises a photonic crystal.

9. The active optical filter of claim 1, wherein said surface grating couplers comprises a trench coupler.

10. The active optical filter of claim 1, wherein said optical filter is tunable to transmit only optical signals of a specified frequency.

11. The active optical filter of claim 1, wherein said optical filter is programmable to transmit only optical signals lying in a passband of specified bandwidth.

* * * * *